Dec. 1, 1959 W. J. ZENNER 2,915,585

SYSTEM AND APPARATUS FOR TRANSMITTING AND PHASING TELEGRAPH SIGNALS

Filed May 27, 1954 2 Sheets-Sheet 1

INVENTOR
WALTER J. ZENNER
BY Emery Robinson
ATTORNEY

INVENTOR
WALTER J. ZENNER
BY Emery Robinson
ATTORNEY

United States Patent Office 2,915,585

Patented Dec. 1, 1959

2,915,585

SYSTEM AND APPARATUS FOR TRANSMITTING AND PHASING TELEGRAPH SIGNALS

Walter J. Zenner, Des Plaines, Ill., assignor to Teletype Corporation, Chicago, Ill., a corporation of Delaware Application May 27, 1954, Serial No. 432,689

14 Claims. (Cl. 178—26)

Figure 1:
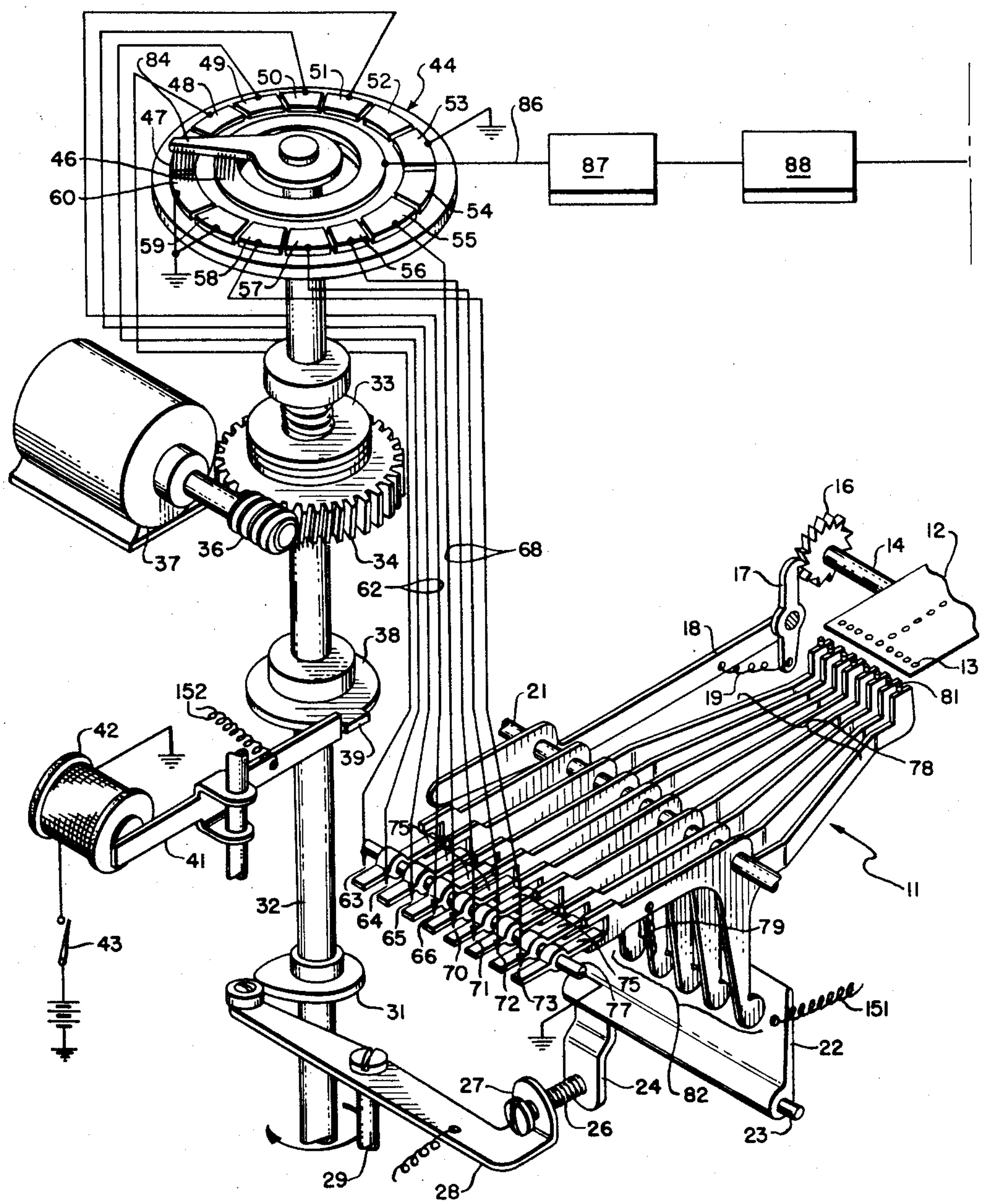

This invention relates to systems and apparatus for transmitting and phasing telegraph signals and more particularly to a system for converting a multi-element signal of a first predetermined number of elements into a plurality of subsignals each having a lesser number of elements, then transmitting the subsignals to a receiver wherein the original signals are recomposed.

In the field of telegraphic communications, many codes are utilized to convey information from one station to another, but in the art wherein the well known printing telegraph apparatuses are employed, a five or six element code has become standardized. When the distances between the telegraph installations are great, the signals are attenuated to such an extent in the course of transmission as to require regeneration at one or more intermediate locations before arrival at the ultimate destination. Apparatus for regenerating signals have been developed and are known as repeaters and in general are electronically or electrically controlled to receive and regenerate five or six element code signals. Further in the course of transmission of telegraph signals, the transmitting and receiving stations are not usually directly connected, but rather the transmission circuits must be established through various switching centers. In these switching centers reperforators and transmitters are employed which are designed to accommodate only five or six element code signals. However, there are numerous business and statistical machines in use today producing intelligence in the form of code signals having seven or more elements. Obviously, intelligence produced in these codes cannot be handled by the afore-enumerated apparatus which are designed to accommodate signals having a lesser number of code elements.

There are several machines in existence which have been developed to convert signals having a relatively large number of code elements into signals having a lesser number of code elements. These signals, produced as a result of a conversion operation, are then suitable for transmission through the regular transmission facilities. In addition there has also been developed terminal receiving machines which reconvert these signals back into a code having the original number of elements. In both instances, the machines are rather costly and utilize complicated mechanisms thereby resulting in high original installation and maintenance costs.

It is a primary object of this invention to provide a relatively simple and inexpensive system for converting signals of a predetermined number of elements into subsignals having a lesser number of elements and then transmitting the converted subsignals to a receiver wherein said subsignals are reconverted back into their original form.

A further object of the invention resides in facilities for breaking a signal having a predetermined number of code elements down into a plurality of signals each having a lesser number of code elements, but in which the spacing or marking characteristic of each individual code element is retained.

Another object of the present invention is the provision of means for automatically generating control impulses with each subsignal for the purpose of maintaining the receiving apparatus in phase with each set of subsignals produced from an original signal.

A still further object of the invention is the provision of instrumentalities for restoring the receiving apparatus to an in phase condition whenever the subsignals of an original signal are not received as subcombinations of the original signal.

A more specific object of the invention resides in a device for releasing the receiving apparatus to run freely when an out of phase condition is detected until such time as the receiving apparatus is again operating in phase with the received subsignals.

With these and other objects in view the present invention contemplates facilities for breaking down a signal having eight code elements into two subsignals having four code elements apiece. This object is accomplished by a tape reader applying the eight element signal to a rotary brush type transmitting distributor having fourteen circumferentially spaced segments, four of which are controlled by the tape reader ascertaining the first four code elements in the tape. Another segment is provided to produce a phase impulse for the four intelligence impulses whereas another two segments are employed to generate start and stop impulses. In a like manner four other segments are adapted to be controlled in accordance with the last four code elements formed in the tape and again a special segment is provided to generate a phasing impulse but in this instance the characteristic of the phasing impulse is reversed in order to discriminate between the two phasing impulses. Start-stop impulses are also generated to respectively precede and follow the impulses generated by the rotary brush passing over these last five interposed segments.

The signals generated by this transmitter distributor are of the well known five element start-stop type and such signals are readily accommodated in all repeating and switching equipment that is normally found in long distance transmission systems.

Terminal equipment is provided to receive each pair of subsignals and recompose said subsignals into an eight element code signal identical in character to the signal originally sensed by the tape reader at the transmitting station. This operation is attained by means of a special signal operated perforator initiated into operation by the start impulse preceding the first subsignal of a pair. As the eight intelligence impulses in each pair of subsignals are received, a bank of punches is accordingly operated to reproduce the original signal. The stop impulse of the first subsignal and the start impulse of the second subsignal are ineffective to control the reperforator in normal operation. The stop impulse associated with the last subsignal is effective to bring the perforator to a stop.

If for some reason or other the first subsignal of a pair or the start impulse of the first subsignal is lost in the process of signal generation or transmission, facilities are provided to insure that the perforator is restored to an in phase condition with the subsequently transmitted signals. This desirable result is achieved by a special lever operated contactor which shunts the receiving perforator when the sequence of phasing impulses accompanying each pair of subsignals is not in accordance with the sequence generated at the transmission station. Operation of the contactor shunts the normally energized receiving magnet in the perforator, therefore permitting the perforator to run uninterruptedly. The perforator therefore will gain on the subsequent incoming signals, due to the fact that the perforator is not stopped upon the receipt of stop impulses, until such time as the proper sequence of phasing impulses is again received whereupon the shunt circuit is removed. Manifestly, the selector magnets will again respond to associated subsignals generated from a single signal and the stop impulse associated with a second subsignal will again stop the perforator following receipt of each pair of subsignals.

Figure 3:
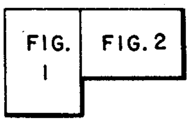
Figures 2, 4:
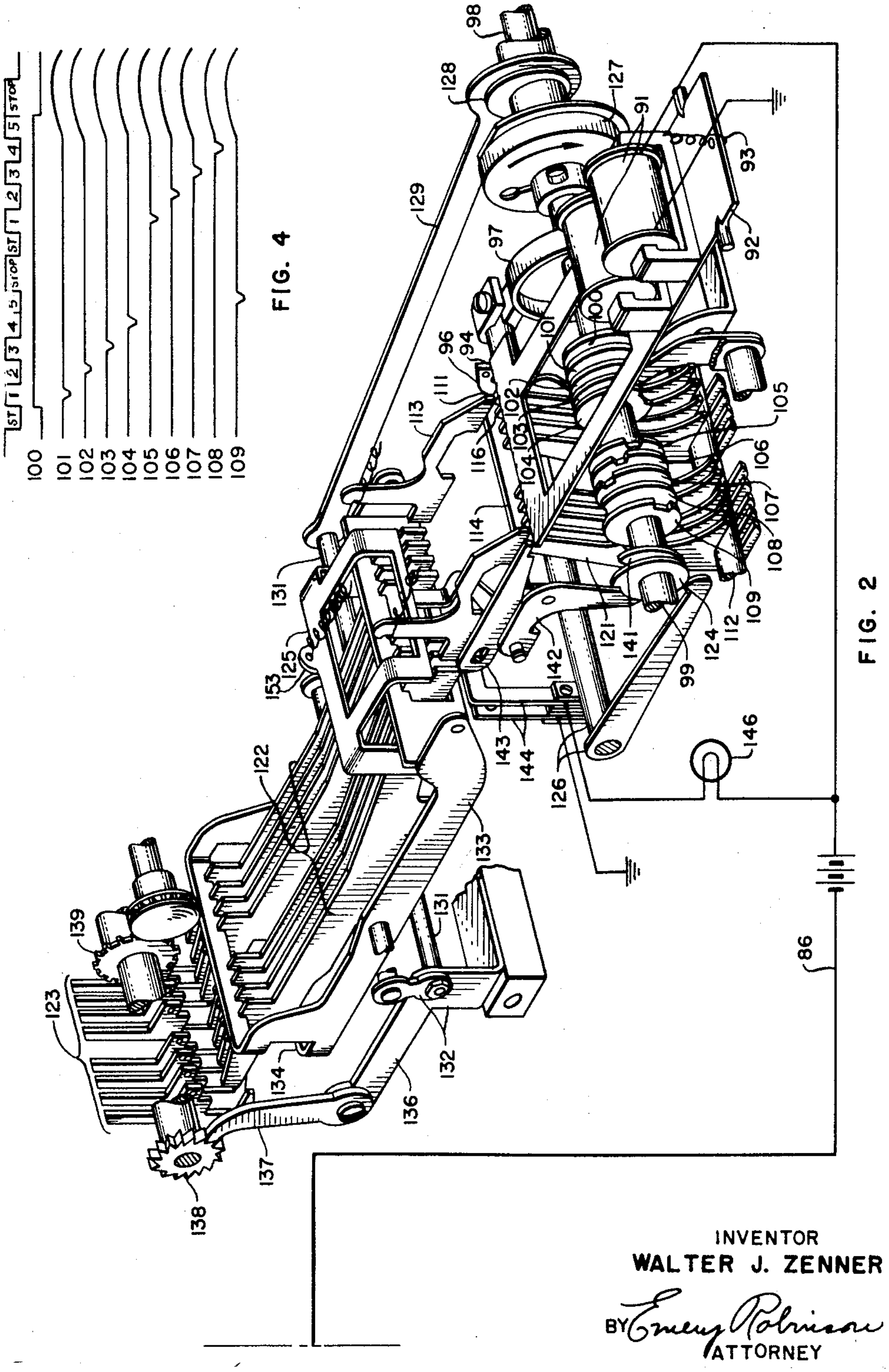

Other objects and advantages of the present invention will be apparent from the following detailed description when considered in conjunction with the accompanying drawings wherein:

Figs. 1 and 2, when assembled as indicated in Fig. 3, illustrate a system having transmitting and receiving facilities embodying the principal features of the invention; and Fig. 4 is a timing diagram showing the operation of perforator operating cams and the receipt of two subsignals with respect to the time necessary to complete a cycle of operation of the selector mechanism in the perforator.

Having reference to Fig. 1, a tape sensing unit is generally designated by the reference numeral 11 and is adapted to receive a message tape 12 from any suitable source or means for preparing the tape. This tape sensing unit is quite similar in structure and in overall operation to a tape reader shown in Teletype Bulletin No. 141, issue 3, issued March, 1952, by the Teletype Corporation, of Chicago, Illinois. The description of the tape reader will be confined to its general operation and to the modifications made therein in order to illustrate the overall operation in the system comprising the invention. Tape 12 has formed therein by any perforating apparatus continuous sets of permutative apertures 13, transversely arranged across the tape to represent intelligence to be conveyed to a distant receiving station. In the present instance, the code assigned to the perforations formed in the tape has eight elements, that is, there is a possibility of having anywhere from zero to eight perforations formed in each transverse row. The tape is further provided with feed holes longitudinally spaced along the center of the tape. Feeding of the tape through the tape reader 11 is attained by a feed wheel (not shown) engaging the feed holes to advance the tape to present a new transverse row of apertures 13 upon each actuation thereof. The feed wheel is secured to a shaft 14 having also mounted thereon a ratchet 16 adapted to be operated by a cyclically operable pawl 17. The pawl 17 is pivotally mounted on a lever 18 and is biased into engagement with the ratchet 16 by a spring 19. Lever 18 is pivotally mounted on a shaft 21. A downwardly extending arm (not shown) of the lever 18 is adapted to be engaged and oscillated by means of a bail 22 pivotally mounted on a rod 23 and biased in a clockwise direction by spring 151. Downwardly extending from the bail 22 is an arm 24 positioned to be engaged by an adjustable screw 26 threadably mounted in an upturned end 27 of a follower lever 28. Follower lever 28 is pivotally mounted on a stud shaft 29 and is spring urged into engagement with a cam 31 fixed to a drive shaft 32.

The shaft 32 has mounted thereon a friction clutch 33 adapted to interconnect the shaft with a spur gear 34. Engaging the spur gear 34 is a worm 36 continually rotated by a suitable electric motor 37. Also secured to the shaft 32 is a disc 38 having extending therefrom a stop lug 39 adapted to cooperate with a stop lever 41. Controlling the position of the stop lever is a spring 152 which urges the lever into a position to cooperate with the stop lug 39 and an electromagnet 42 energized through a suitable circuit including a manually operable switch 43. When the switch 43 is closed, a circuit is completed to energize the electromagnet 42 which thereupon draws up the lever 41 which moves from engagement with the stop lug 39 thereby permitting power to be transmitted from the motor 37 to the worm 36 through the spur gear 34, through the clutch 33, to the shaft 32.

A transmitting distributor unit generally designated by the reference numeral 44 comprises a commutator ring 46 and fourteen circumferentially spaced conductive segments 47 through 60, inclusive. The segments 48 to 51 are connected through a set of leads 62 to contacts 63 to 66, inclusive. Segments 55 to 58, inclusive, are connected by means of leads 68 to contacts 70 to 73, inclusive. Associated with each of the contacts 63 to 66 and 70 to 73 are contact arms 75 individually mounted in a pivotal fashion about a conductive rod 77. The positions assumed by the contact arms 75 are controlled by means of sensing levers 78 individually mounted for pivotal movement about the shaft 21. Each sensing lever 78 is urged by a spring 79 to move in a counterclockwise direction to position pins 81 mounted thereon in engagement with the underside of the tape 12. However, this movement is precluded by extensions 82 formed on each of the sensing levers 78 and which are adapted to be engaged and held in position by the bail 22.

Attention is again directed to the transmitting distributor 44 wherein the segments 47 and 54 are not connected to ground or any other source of potential and are designated start segments because these segments control the generation of a start impulse to precede each generated signal. Segments 53 and 60 are connected to ground and are designated stop segments because in the operation of the transmitting distributor these segments function to generate stop impulses following each transmission of a signal. Segment 52 is not connected to any source of potential whereas segment 59 is connected to ground. These segments 52 and 59 are designated phasing segments because during the course of the generation and transmission of signals these segments function to generate impulses which phase one subsignal with respect to another.

Secured to the shaft 32 is a brush arm 84 adapted to span the commutator ring 46 with the segments 47 to 60 during each complete rotation of the shaft 32. Commutator ring 46 is connected by a signaling channel 86, through a switching center 87 through a repeating station 88 to a receiving apparatus shown in Fig. 2. The switching center 87 may be of any well known type and the only function it performs is to select a route of transmission for the message originating at the station shown in Fig. 1. Repeating station 88 operates to regenerate weak signals and reapplies them to the signaling channel so that when said signals are received in the apparatus shown in Fig. 2 they may positively operate the apparatus thereat.

The apparatus shown in Fig. 1 operates as follows: Upon each rotation of the shaft 32, the lever 28 is oscillated by the cam 31 to impart an oscillatory motion to the bail 22. Movement of the bail 22 in a counterclockwise direction causes the sensing levers 78 to be pivoted in a clockwise direction to withdraw the pins 81 from engagement with the tape 12. Simultaneously with the withdrawal of the pins 81 from the tape 12, the pawl 17 is actuated in a downwardly direction to impart a rotative movement to the ratchet 16 which in turn causes the feed wheel (not shown) on the shaft 14 to rotate thereby advancing the tape 12 to present a new transverse row of apertures 13 to a position in register with the pins 81. Continued movement of the cam 31 results in a clockwise movement being imparted to the bail 22 thereby withdrawing the bail from engagement with the extensions 82. Immediately thereupon the springs 79 are effective to move the sensing levers 78 in a counterclockwise direction, thus permitting the pins 81 to probe for apertures formed in the tape 12. Obviously those pins sensing apertures in the tape move in a counterclockwise direction further than those pins which engage nonapertured sections of the tape. Each of the sensing levers positioned in accordance with apertures in the tape effectuate a pivotal movement to the contact arms 75 in a counterclockwise direction to cause these arms to close with the associated stationary contacts 63 to 66 and 70 to 73. Upon closure of the contact arms 75 with the associated stationary contacts, ground potential is applied through rod 77, through the now closed contact pairs, over the leads 62 or 68, to the segments connected to these leads. It is to be noted that the first four code elements (apertures 13) in the tape 12 control the application of an open circuit condition or a ground potential condition over the leads 62 to the segments 48 to 51, inclusive, whereas the remaining four code elements (apertures 13) control the application of an open line or a ground potential condition over the leads 68 to the segments 55 to 58, inclusive.

Rotation of the shaft 32 causes the brush 84 which normally rests on the stop segment 60 to first pass over the segment 47 to impress an open circuit condition on the signaling line 86 which is indicative of a start impulse. Brush 84 thereupon successively moves over the segments 49 to 51 to impress a permutation of code elements on the signaling line 86 indicative of the permutative arrangement of the first four apertures 13 formed in the tape 12. When the brush 84 passes over the segment 52, a no current or open line condition is again impressed on the signaling line 86. The brush 84 then moves over the segment 53 to permit current to flow over the transmission line 86 and this element of the code impressed on the signaling line is representative of a stop impulse.

In a like manner as the brush 84 passes over the segments 54 to 60, a start impulse will be first impressed on the signaling line, then the code impulses representative of the last four apertures 13 of a row of apertures presented to the sensing pins 81. However, as the brush 84 passes over the segment 59, ground potential will be connected to the signaling line 86 thereby impressing on the line a marking or current impulse which is indicative of the second phasing impulse. Marking condition will be retained on the line 86 as the brush moves on to the segment 60 because this segment is also connected to ground potential, but the period of time during which the brush 84 is passing over the segment 60 is representative of a stop impulse.

Recapitulating briefly, it may be observed that each presentment of a row of apertures 13 to the sensing pins 81 results in the impression on the transmission line 86 of two signals which may be denoted subsignals, the first subsignal will consist of a start impulse, four intelligence impulses, a no current phasing impulse and a stop impulse, whereas the second subsignal will consist of a start impulse, four intelligence impulses, a second current or marking phasing impulse and a stop impulse. The switching center 87 and the repeating station 88 have facilities therein adapted to accommodate the start-stop signal having five code elements. It may be thus appreciated that these stations may readily handle signals transmitted thereto in the form as generated by the transmitter 44. Moreover, it is believed obvious that if the signals were generated as a start-stop signal having eight intelligence impulses representative of the apertures 13, for a total of ten elements in each code signal, then the switching station 87 and repeating station 88 could not perform their designated functions in response to signals of this nature.

Attention is now directed to Fig. 2 wherein a receiving apparatus is shown for reconverting the subsignals back into the original form. This reconverter comprises a reperforator similar to the perforating apparatus shown in the patent to J. L. De Boo No. 2,545,198, dated March 13, 1951. In the following description only so much of the perforating apparatus will be described as to make the present inventive features apparent to those skilled in the art.

Signals are received from the repeating station 88 in Fig. 1 over the signaling line 86 and are applied to a pair of selector magnets 91. Reception of the start impulse associated with the first subsignal causes the selector magnets 91 to become de-energized thereby releasing an armature 92. Armature 92 thereupon moves under the urging of a spring 93 to withdraw a forwardly extending edge from engagement with a shoulder 94 of a start release lever 96. The start lever 96 is identical to the lever 31 shown in the afore-identified De Boo patent and as described in this patent the release of the lever 96 effectuates through suitable linkage the release of a clutch 97 to permit rotative power from a constantly rotating shaft 98 to be applied to a shaft 99 having a set of selector cams 100 to 109, inclusive, mounted thereon. The contours of these cams are disclosed in Fig. 4 wherein low portions of the cam are shown with respect to an incoming pair of start-stop subsignals. The reception of the first intelligence signal element or impulse which is represented as a marking impulse in Fig. 4 results in the energization of the selector magnet 91 to draw up the armature 92. When the armature 92 is drawn up a low portion of the cam 101 is presented to a follower lever 111 permitting this lever to move in a clockwise direction about a pivot shaft 112. Forward movement of the lever 111 permits a slide member 113 resting on the top surface thereof to move downward in front of the forward face of the lever until it rests upon a bail 114.

The next element of the subsignal is a spacing impulse which causes the selector magnets 91 to become de-energized thereby allowing the associated armature 92 to move down into position to prevent a second lever 116 from following the low portion of the cam 102. This follower lever 116 also has a slide member associated therewith (not shown) but as this lever does not move, the slide member is retained in its unoperated position. In a like manner other follower levers and slide members are permutatively positioned in accordance with the subsequently received intelligence impulses of the two subsignals. When the signal element indicative of the phase impulse, generated due to the brush 84 passing over the segment 52, is received by the selector magnets 91, the magnets are de-energized to position the armature 92 in position to prevent a follower lever 121 from following the contour of the cam 109. The preclusion of the movement of the follower lever 121 is indicative of a proper phasing condition and no alteration is made in the subsequent operation of the perforating apparatus.

Following permutative positionment of the slide members, the cams 101 to 108 present high portions to the follower levers associated therewith to move those slide members which have been dropped down in front of the forward faces of the follower levers. Each slide member is associated with an interponent 122; therefore, movement imparted to the slide members is also imparted to the associated interponents 122. The forward end of each interponent is positioned in register with a notch formed in a punch 123. As each interponent 122 is moved into a notch formed in a punch 123, a spring 153 urges a latch 125 to drop in behind the trailing extremities of the interponents to latch these elements in a selected position.

During the receipt of each signal, a cam 124 mounted on the shaft 99 actuates a linkage generally denoted by the reference number 126 to release a clutch 127. Release of the clutch 127 permits rotative power to be imparted from the shaft 98 to an eccentric 128 to drive an operating link 129. Link 129 is pivotally connected to an operating rod 131 of a toggle linkage 132. The toggle linkage 132 is connected to a pivotally mounted frame 133 having a cross member 134 underlying all of the interponents 122. If a permutative setting has been imparted to the interponents 122 then the upward movement of the frame 133 causes the cross member 134 to move upwardly and move all the interponents 122 in an upwardly direction. Those interponens which have been positioned within the notches formed in the punches 123 thereupon move these punches upwardly into position to effectuate a perforation of a tape (not shown). Inasmuch as the punches 123 are moved in accordance with the receipt of marking impulses by the selector magnet then it may be readily understood that the tape is perforated in a manner which is identical to the permutation of apertures 13 appearing in the tape 12.

As the toggle mechanism 132 is straightened to actuate the frame 133, an extended portion 136 thereof pivots in a counterclockwise direction to pull a pawl 137 downwardly causing it to slip over one tooth on a ratchet wheel 138 and thereafter as the toggle mechanism again collapses, the feed pawl 137 is moved upwardly to step the ratchet wheel 138. Ratchet wheel 138 is adapted to drive a feed wheel punch 139; consequently, as the ratchet 138 is advanced the feed wheel punch 139 acts to advance a new section of tape into position in register with the punches 123.

It is to be undertsood that during the operation of the perforating apparatus, a first pair of subsignals is received to permutatively select the slide members and during this period of time the punches 123 are being operated to perforate the tape in accordance with the receipt of a preceding pair of subsignals, thereby providing a complete overlapping of receipt of signals and operation of the punching mechanism. Following receipt of each pair of subsignals a cam 141 operates a latch release linkage 142 to release the latch 125 holding the interponents in selected position, thereby permitting the interponents to assume their normal position in preparation for operation by the permutatively positioned slide members. Immediately after the receipt of a start impulse permitting the shaft 99 to commence rotation, a cam mounted on this shaft actuates the bail 114 to move upwardly to release all of the selected slide members to again permit their positionment on top of their associated follower levers. The follower levers are now in position to be selectively actuated in accordance with the receipt of the pair of incoming subsignals.

If for some reason or other a marking or current impulse is received by the selector magnet during the time that the low portion of the cam 109 is presented to the follower 121 then this follower will move in a clockwise direction permitting an associated operating arm 143 to drop down. Attention is again directed to Fig. 4 wherein it is to be noted that a high portion is provided for the cam 109 which is presented to the follower arm 121 at the same time that the stop pulse associated with the second subsignal is being received by the selector magnets 91. The high portion of the cam 109 moves the following lever 121 in a clockwise direction to move the operating arm 143 toward the left. Movement of this arm 143 closes a contact pair 144 to complete a shunt circuit for the signaling line 86.

With the signaling line 86 shunted, the selector magnet 91 will not be energized in accordance with the stop impulse and as a result the armature 92 will not be moved into position to engage the shoulder 94 of the clutch trip lever 96. In normal operation of the perforating apparatus the clutch 97 is disengaged following receipt of each pair of subsignals to permit the shaft 99 to come to a rest but, with the selector magnet 91 now deenergized, the clutch 97 is retained in operative condition. The shaft 99 continues to rotate thereby causing the cams mounted thereon to advance in relation to the time of reception of the subsequently received pairs of subsignals over the signaling line 86. The cams will continue to gain on the incoming signals until such time as a spacing signal is received by the selector magnets 91 and the cam 109 is presenting a low portion to the follower 121, then the operating arm 143 will not be moved toward the left and the contact pair 144 will be retained in an opened condition to remove the shunt circuit from the signaling line 86. Thus when the stop signal associated with the second signal of this pair of subsignals is received the armature 92 will be in position to engage the shoulder 94 to permit the release of the clutch 97 thereby removing the source of rotative power from driving connection with the shaft 99.

Briefly recapitulating, on this feature of the invention, the receipt of a pair of subsignals not in accordance with the signals generated from a single row of apertures 13 formed in the tape 12 usually results in an impression of a marking impulse on the selector magnets 91 when the low portion of the cam 109 is presented to its follower lever 121. The follower lever 121 is thereupon operated to move the operating arm 143 toward the left to close a contact pair 144 to shunt the selector magnets 91 with respect to the signaling line 86. This operation allows the perforating apparatus to run freely and thereby gain on the incoming pairs of subsignals until such time as a pair of subsignals is received wherein the fifth impulse (phasing impulse) of the first subsignal is a marking or current impulse. When such a spacing impulse is received as the fifth element of the first subsignal, then the follower arm 121 and operating arm 143 are not operated and the contact pair 144 is retained in open condition removing the shunt circuit from the selector magnets. An indicating lamp 146 is incorporated in the shunt circuit thus when an out of phase condition exists in the transmission circuit and the reperforating apparatus is not responding to pairs of subsignals, the indicating lamp is operated to give visual notice to an attendant that the intelligence perforated in the tape does not represent the intelligence formed in the tape 12 at the transmitting station.

It is to be understood that the above-described arrangements of apparatuses and construction of elemental parts are simply illustrative of the principles of the invention and many other modifications may be made without departing from the invention.

What is claimed is:

1. In a system of telegraphic communication, a source of permutation code signals having a predetermined number of elements, means controlled by each code signal for generating and transmitting at least two start stop code signals having a lesser number of code elements than said predetermined number wherein each start stop signal has included therein a number of said elements of the original signal, and means responsive to said series of start-stop signals for reproducing the original signal.

2. In a communication system, means for breaking down an original signal having a predetermined number of intelligence elements into a plurality of subsignals each having a lesser number of elements but which the total number of intelligence elements in the subsignals are equal to the number of intelligence elements in the original signal, means for generating and transmitting start and stop impulses to accompany each subsignal, means initiated into operation by the start impulse accompanying the first subsignal for receiving all the subsignals of the original signal, and means actuated by the receiver for recomposing said subsignals into a signal having the original predetermined number of elements.

3. In a communication system, a source of original signals having a predetermined number of elements, means for generating from each of said original signals a plurality of start stop subsignals, means for generating a phasing impulse to accompany each subsignal, means responsive to said subsignals generated from each original signal for reproducing said original signal, and means responsive to said phasing impulses accompanying said subsignals for maintaining the signal responsive means in phase with the subsignals generated from each original signal.

4. In a communication system, means for transmitting multi-element signals where each signal is divided in subsignals, means for generating start-stop impulses to accompany each subsignal, means for generating a phasing impulse of predetermined character to accompany each transmitted signal said phasing impulse generating means adapted to generate each succeeding phasing impulse of opposite characteristic, means for receiving said subsignals and reassembling the subsignals into the original multi-element signals, and means controlled by the characteristic of the phasing impulses for maintaining proper phase relationship between the receiving means and the received signals.

5. In a system of telegraphic combination, a source of signals having a predetermined number of elements, means controlled by each signal for generating and transmitting a series of start-stop signals wherein each start-stop signal has included therein a portion of the elements of the original signal, means for generating a phasing impulse of predetermined character to accompany each transmitted signal, means responsive to each of said series of start-stop signals for recomposing said original signal, means operated by the start impulse preceding the first signal for initiating said signal responsive means into operation, means operated by the stop impulse associated with the last start-stop signal of each of said series for stopping operation of said signal responsive means, and means responsive to said phasing impulses for rendering ineffective aid stop means when said phasing impulses are not of said predetermined character.

6. In a telegraph transmitting and receiving system, means for reading coded signals impressed in a tape, each of said coded signals having eight intelligence elements, a rotary brush type segmental transmitting distributor, said transmitting distributor having two sets of start-stop segments and five intelligence segments between each set of start-stop segments, means controlled by the tape reading means for applying signal conditions representative of the first four elements of the signal impressed in the tape to a first set of said intelligence segments, means also controlled by the tape reading means for applying signal conditions representative of the remaining four elements of the signal impressed in the tape to a second set of said intelligence segments, means for applying phasing signal conditions having characteristic differences to the two remaining intelligence segments, a signalling channel connected to said transmitting distributor, means for operating the transmitting distributor to apply two start-stop signals on the signalling channel, a receiving device connected to said signalling channel for receiving said two start-stop signals, means actuated by the receiving device for recomposing said original signal, and means controlled by the phasing impulses accompanying each pair of start-stop signals for maintaining the receiving means in phase with the incoming pairs of start-stop signals.

7. In a perforating apparatus operable in accordance with a pair of start-stop signals, each of said signals comprising marking and spacing elements a selector mechanism including a rotatable member operable in cycles of one revolution, a drive means, means responsive to the reception of a spacing element accompanying the first signal of a pair for connecting said drive means to said rotatable member, a plurality of punching means, means operated by the selector mechanism in accordance with predetermined spacing and marking elements of the pair of signals for simultaneously operating a corresponding permutation of said punching means, and means effective to arrest rotation of said rotatable member upon coincidence of the completion of a revolution thereof and the reception of a marking element a predetermined interval after the reception of a spacing element other than the spacing element that initiated said rotation for disconnecting said drive means from said selector mechanism.

8. In a perforating apparatus, a plurality of settable punch means, a selector mechanism responsive to a series of telegraph signals comprising marking and spacing elements, said selector mechanism including a rotatable member a clutch controlled power means, means within the selector mechanism responsive to a first spacing element accompanying the first of said series of signals for releasing the clutch to apply drive to the rotatable member of the selector mechanism in timed relation to the signal elements of said series of signals, means operated by the selector mechanism for controlling the setting of the punch means in accordance with said series of signals, means responsive to the coincidence of the completion of a revolution of the rotatable member and the reception of a marking element a predetermined interval after a second spacing element for disconnecting the clutch controlled power means, and means controlled by the selector mechanism in response to a marking element received instead of said second spacing element for precluding the disconnection of said clutch controlled power means.

9. In a recorder for receiving telegraph signals comprising marking and spacing elements, a selector mechanism including a rotatable cam assembly operable in cycles each comprising one revolution, means for driving said cam assembly including a clutch engageable to impart rotation to said cam assembly and releasable to cause arrestment of said cam assembly, recording means, means operable by the rotatable cam assembly for operating said recording means in accordance with the received telegraph signals, and means including a start lever responsive to the reception of a first spacing element to cause engagement of said clutch to initiate rotation of said cam assembly and operation of said recording means, said start lever also being operably effective to cause disengagement of said clutch whereby said driving means is disconnected from said cam assembly and operation of said recording means is suspended upon the coincidence of the completion of a revolution of said cam assembly and the reception of a marking element a predetermined interval after the reception of a second spacing element.

10. In a recorder for recording telegraph signals comprising marking and spacing elements, a signaling line over which said signals are received, a selector mechanism including a rotatable cam assembly operable in cycles each comprising one revolution, means for driving said cam assembly including a clutch engageable to impart rotation to said cam assembly and releasable to cause arrestment of said cam assembly, recording means operable by the rotatable cam assembly in accordance with the received telegraph signals, means including a start lever responsive to the reception of a first spacing element to cause engagement of said clutch to initiate rotation of said cam assembly and operation of said recording means, said start lever also being operably effective upon the coincidence of the completion of a revolution of said cam assembly and the reception of a marking element a predetermined interval after the reception of a second spacing element whereby said cam assembly and said recording means are arrested, and means conditioned upon reception of a marking element instead of said second spacing element for shunting signals on said line away from said recorder to preclude cam assembly arresting effectiveness of said start lever.

11. In a receiving selector mechanism for receiving telegraph signals comprising marking and spacing elements, a rotatable member operable in cycles each comprising one revolution, means for driving said rotatable member, means responsive to the reception of a spacing element for initiating rotation of said rotatable member, and means effective to arrest said rotatable member upon coincidence of the completion of a revolution thereof and the reception of a marking element a predetermined interval after the reception of a spacing element other than the spacing element that initiated the rotation of said rotatable member.

12. In a receiving selector mechanism for receiving telegraph signals comprising marking and spacing elements; a rotatable cam assembly operable in cycles each comprising one revolution means for driving said cam assembly, means responsive to a first spacing element for initiating rotation of said cam assembly, means to arrest rotation of said cam assembly upon coincidence of the completion of a revolution thereof and the reception of a marking element a predetermined interval after a second spacing element, and means conditioned upon reception of a marking element instead of said second spacing element for precluding arrestment of said cam assembly.

13. In a receiving selector mechanism for receiving telegraph signals comprising marking and spacing elements, a rotatable cam assembly operable in cycles each comprising one revolution, means for driving said cam assembly including a clutch engageable to impart rotation to said cam assembly and releasable to cause arrestment of said cam assembly, and means including a start lever responsive to the reception of a spacing element to cause engagement of said clutch to initiate rotation of said cam assembly, said start lever also being operably effective to cause disengagement of said clutch whereby rotation of said cam assembly is suspended upon the coincidence of a revolution of said cam assembly and the reception of a marking element a predetermined interval after the reception of a spacing element other than the spacing element that initiated said rotation of said cam assembly.

14. In a receiving selector mechanism for receiving telegraph signals comprising marking and spacing elements, a rotatable cam assembly operable in cycles each comprising one revolution, means for driving said cam assembly including a clutch engageable to impart rotation to said cam assembly and releasable to cause arrestment of said cam assembly, means including a start lever responsive to the reception of a first spacing element to cause engagement of said clutch to initiate rotation of said cam assembly and also operably effective to cause disengagement of said clutch whereby said driving means is disconnected from said cam assembly upon the coincidence of the completion of a revolution of said cam assembly and the reception of a marking element a predetermined interval after a second spacing element, and means conditioned upon reception of a marking element instead of said second spacing element for shunting signals away from said selector mechanism to preclude clutch disengaging effectiveness of said start lever.

References Cited in the file of this patent

UNITED STATES PATENTS

| | | |
|---|---|---|
| 1,496,875 | Field | June 10, 1924 |
| 2,135,005 | Potts | Oct. 25, 1938 |
| 2,490,608 | Zenner | Dec. 6, 1949 |
| 2,518,405 | Van Duuren | Aug. 8, 1950 |
| 2,520,142 | Herbst | Aug. 29, 1950 |
| 2,545,198 | De Boo | Mar. 13, 1951 |
| 2,603,705 | Van Duuren | July 15, 1952 |
| 2,673,236 | Phelps et al. | Mar. 23, 1954 |

UNITED STATES PATENT OFFICE

CERTIFICATE OF CORRECTION

Patent No. 2,915,585 December 1, 1959

Walter J. Zenner

It is hereby certified that error appears in the printed specification of the above numbered patent requiring correction and that the said Letters Patent should read as corrected below.

Column 9, line 8, for "combination" read -- communication --; line 23, for "aid" read -- said --.

Signed and sealed this 31st day of May 1960.

(SEAL)

Attest:

KARL H. AXLINE

Attesting Officer

ROBERT C. WATSON

Commissioner of Patents